(No Model.)
C. PIEPER.
BARBED WIRE FENCE.
No. 259,205. Patented June 6, 1882.
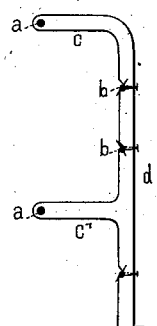
Fig. 1.
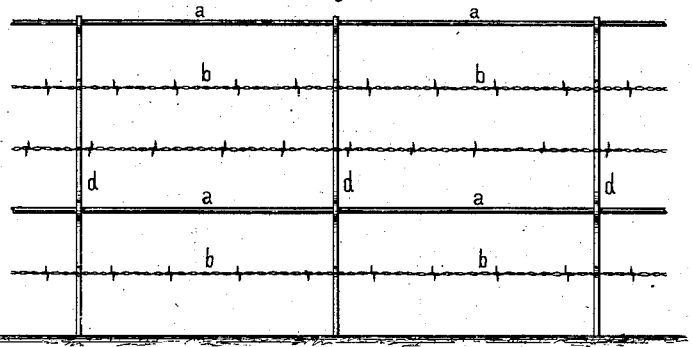
Fig. 2.
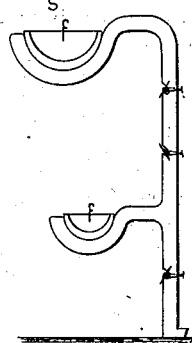
Fig. 5.
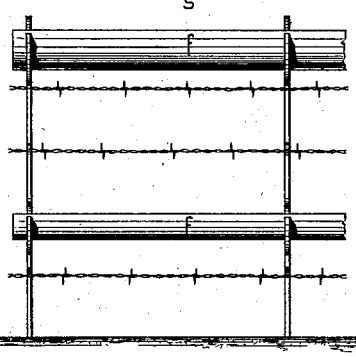
Fig. 6.
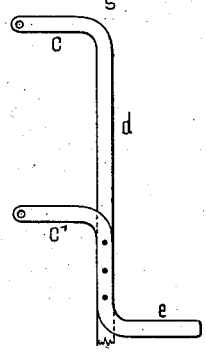
Fig. 3.
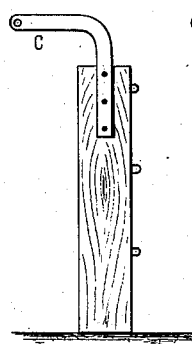
Fig. 7. Fig. 8. Fig. 9.
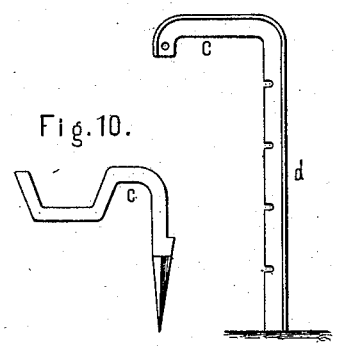
Fig. 4.
Fig. 10.
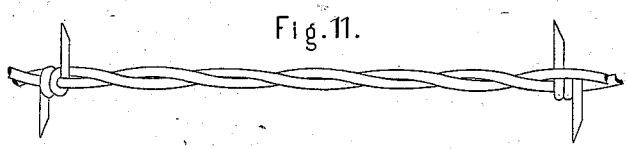
Fig. 11.
Witnesses: Inventor:

UNITED STATES PATENT OFFICE.

CARL PIEPER, OF BERLIN, GERMANY.

BARBED-WIRE FENCE.

SPECIFICATION forming part of Letters Patent No. 259,205, dated June 6, 1882.

Application filed April 12, 1882. (No model.)

*To all whom it may concern:*

Be it known that I, CARL PIEPER, engineer, residing in Berlin, Prussia, Germany, have invented certain new and useful Improvements in Barbed-Wire Fences, of which the following is a specification.

My invention consists in providing barbed-wire fences with guards, which, when the fence is used for inclosing pasture-land, are adapted to prevent the cattle or horses being within the inclosure from rubbing against the barbed wires, and from being wounded thereby.

The invention is represented on the annexed sheet of drawings.

Figure 1 is an end view, and Fig. 2 an elevation, of the improved fence. Figs. 3 to 10 represent different modifications thereof; and Fig. 11 shows a sample of barbed wire, such as is frequently used.

Although barbed-wire fences have found great favor for the purpose of inclosing fields, they present the disadvantage, when used on pasture-land, that the cattle rubbing against the fence are often wounded by the projecting points of the barbed wire, which, especially in hot climates, may be of serious consequences. In order to prevent this I provide the fence with smooth guard-wires $a\, a$, Figs. 1 and 2, arranged on the inside of the same, and at such a distance from the barbed wires $b\, b$ that the cattle will not, without special exertion, be able to touch the latter. The upper wire $a$ is held by arms or brackets $c$, which will ordinarily be formed in one piece with the posts $d$, when these are made of iron, as has been supposed in Figs. 1 and 2, whereas the arms $c'$ for the lower wire $a$ may be welded to the posts, as in Fig. 1, or attached thereto by screws or rivets, as shown by Fig. 3. When $c'$ and $d$ are connected together, as in Fig. 3, either $d$ or the vertical part of $c'$ may be made of such extra length as is required to plant the post firmly into the ground, and the lower end, $e$, of the part $c'$ or $d$ which is not employed for fixing the post, may be bent outward in order to prevent the ground close to the fence from being used as a foot-path.

The lower guard-wire will ordinarily be required only when animals of small size—such as sheep and calves—are kept in the inclosure, whereas for large cattle and horses the upper wire alone may be considered sufficient.

Instead of but one or two guard-wires, three or more may be used, if preferred, the arms to carry them being of course multiplied accordingly.

Fig. 4 shows a post for a single guard-wire, made of angle-iron.

The arms $c$ and $c'$ may be employed to carry water-troughs $f\, f$, Fig. 5, for watering the cattle, and these troughs may serve in such case, upon the extent of their length, as guards instead of the wires $a\, a$.

When wooden fence-posts are used the arms are attached to the side thereof by nails or screws, as in Fig. 7, or, as regards the arms $c'$, they may be forged with a fang or spike, to be driven into the post from above, as shown by Figs. 8 and 9. Wooden arms might, however, also be used. Fig. 10 is an iron arm to be fixed to a wooden post and adapted to carry a watering-trough.

In the drawings the guard-wires are represented as being passed through holes in the arms $c$ and $c'$; but instead thereof they may be introduced into notches cut into the arms, and similar to those shown for the attachment of the barbed wire. After having been placed in the notches, the guard-wires are secured by means of binding-wire or by hammering down the edges of the notches and closing these thereby.

I claim as my invention—

1. The combination, with a barbed-wire fence, of one or more smooth guard-wires, $a$, fixed to an arm or arms projecting laterally from the fence-posts, substantially as and for the purpose described.

2. The combination, with a barbed-wire fence, the posts of which are provided with a laterally-projecting arm or arms carrying the wire or wires $a$, of one or more watering-troughs, $f\, f$, supported by the said arm or arms, as hereinbefore described.

In testimony whereof I have signed my name to this specification in the presence of two subscribing witnesses.

CARL PIEPER.

Witnesses:
 B. ROI,
 FRANZ SCHMIDT.